United States Patent [19]

Mechin

[11] Patent Number: 5,074,762

[45] Date of Patent: Dec. 24, 1991

[54] COMPACT STRUCTURAL ASSEMBLY FOR FEEDING PROPELLANTS AT HIGH PRESSURE TO A ROCKET ENGINE

[75] Inventor: Claude Mechin, Saint Marcel, France

[73] Assignee: Societe Europeenne de Propulsion, Suresnes, France

[21] Appl. No.: 445,453

[22] Filed: Dec. 4, 1989

[30] Foreign Application Priority Data

Dec. 12, 1988 [FR] France .................. 88 16340

[51] Int. Cl.[5] ............... F02K 9/48; F01D 25/26; F04B 17/00
[52] U.S. Cl. .................... 417/409; 60/259; 415/138
[58] Field of Search ............ 60/257, 259, 39.32; 417/406, 407, 409; 415/108, 168.1, 174.2, 134, 135, 138, 214.1

[56] References Cited

U.S. PATENT DOCUMENTS

| | | | |
|---|---|---|---|
| 3,601,993 | 8/1971 | Bringer | 60/259 |
| 3,991,248 | 11/1976 | Bauer | 428/245 |
| 4,218,180 | 8/1980 | Wikstrom | 415/138 |
| 4,384,822 | 5/1983 | Schweikl et al. | 415/138 |
| 4,752,503 | 6/1988 | Thebault | 427/248 |
| 4,790,052 | 12/1988 | Olry | 28/110 |

*Primary Examiner*—Louis J. Casaregola
*Assistant Examiner*—Howard R. Richman
*Attorney, Agent, or Firm*—Poms, Smith, Lande & Rose

[57] ABSTRACT

The compact structural assembly comprises a gas generator, and two turbopumps for feeding the combustion chamber of a chamber of a rocket engine with propellants. A main structure which is essentially circularly symmetrical about the axes of rotation of the turbopumps and made of thermostructural composite materials surrounds the turbines and fixes together the body of the gas generator and the pump bodies of the turbopumps. Internal partitioning elements added to the main structure and likewise made of thermo-structural composite materials serve to divide the space inside the main structure into a plurality of intercommunicating cavities allowing hot gases from the gas generator to flow to the turbines, and also serving to collect the outlet gases from the turbines and exhaust them through a common exhaust duct.

13 Claims, 4 Drawing Sheets

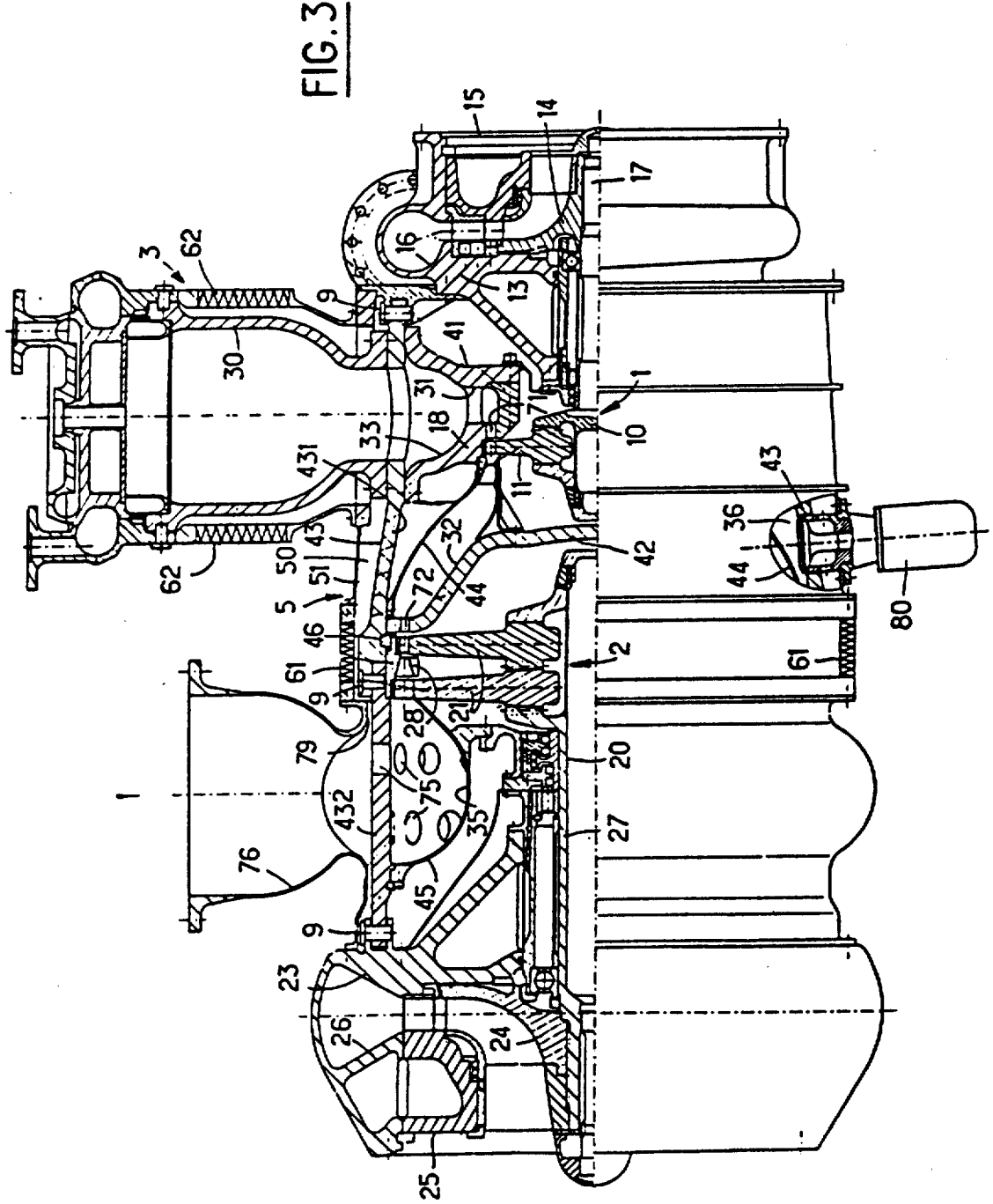

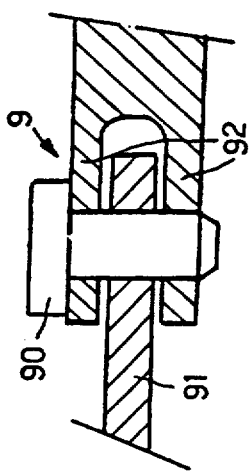
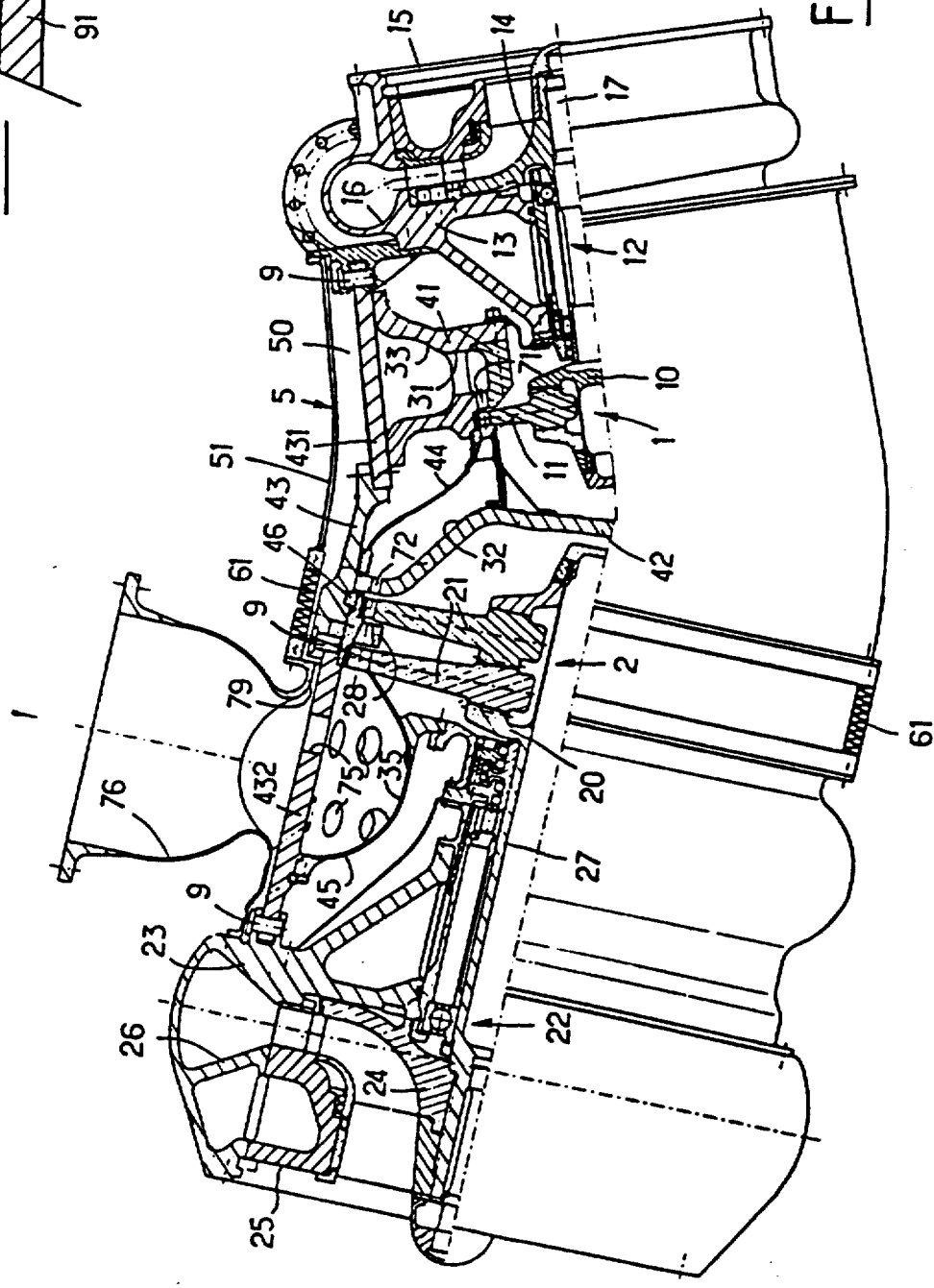

COMPACT STRUCTURAL ASSEMBLY FOR FEEDING PROPELLANTS AT HIGH PRESSURE TO A ROCKET ENGINE

The present invention provides a compact structural assembly for feeding propellants at high pressure to a rocket engine, the assembly comprising a gas generator, a first turbopump constituting a first turbine and a first pump for feeding the combustion chamber of the rocket engine with a first propellant, a second turbopump constituted by a second turbine and a second pump for feeding the combustion chamber of the rocket engine with a second propellant, means for delivering the hot gases from the gas generator to said first and second turbines, and means for collecting and exhausting the hot outlet gases from said turbines.

BACKGROUND OF THE INVENTION

For example, in the rocket engine known under the name VULCAIN, there already exists a device for feeding the combustion chamber of a rocket engine with propellants (hydrogen and oxygen) at high pressure, the device comprising two independent turbopumps with the energy required for driving the turbopumps being provided by combustion gases created in a single gas generator which is itself fed with oxygen and hydrogen by bleeding from the pump outlets, using a bleed flow cycle.

In the above-mentioned engine, the two turbopumps for raising the pressure of the liquid hydrogen and oxygen are made from various alloys or metals suitable for withstanding the thermal stresses concerned and they are separately mounted on a frame using conventional architecture with the connections between the gas generator and the turbines being provided by metal pipework. This architecture gives rise to considerable bulk and imposes limits on operating temperatures and reduces the opportunities for improving efficiency.

Proposals have also been made to use thermo-structural composite materials for providing the chamber of a gas generator and for providing the pipework for distributing the hot gases. The pipework made of thermo-structural composite materials is capable of withstanding higher temperatures than metal pipework, but using such pipework leads to a very complex implementation. Composite pipework requires metal sheaths to be used for picking up leaks due to porosity, and also for counteracting their high levels of thermal radiation.

The present invention seeks to remedy the above-mentioned drawbacks and to simplify the architecture of a propellant assembly so as to guarantee reduced bulk, ease of disassembly, and reduced mass, and also to make it possible to increase efficiency by making it possible to use steep temperature gradients inside the assembly while still satisfying safety requirements.

SUMMARY OF THE INVENTION

These objects are achieved by a compact structural assembly for feeding propellants at high pressure to a rocket engine of the type specified at the beginning of the description, and further comprising a main structure which is substantially circularly symmetrical about the axes of rotation of the first and second turbopumps, the main structure being made of thermo-structural composite materials, surrounding said first and second turbines, and interconnecting the body of the gas generator with the pump bodies of the first and second turbopumps; internal partition elements applied to said main structure and likewise made of thermo-structural composite materials, the partition elements dividing the space inside the said main structure into a plurality of intercommunicating cavities enabling the hot gases from the gas generator to flow to said first and second turbines, and also serving to collect the outlet gases from said turbines and to exhaust said gases towards a common exhaust duct; and a leakproof outer metal enclosure which surrounds said main structure, which constitutes a screen against thermal radiation from said main structure of composite materials, and which delimits an annular space opening out into said exhaust duct and serving to recover the outlet gases from the turbines and also the gases due to leaks through the porous composite walls.

Advantageously, radial pins provide the connections between the pump bodies constituted by cold parts and the said main structure constituted by hot parts, with the radial pins keeping said main structure centered while allowing for major relative changes in diameter between the main structure and the pump bodies.

In a first embodiment, the invention is applicable to a structural assembly in which the turbines of the first and second turbopumps are fed in parallel from the gas generator, and the partitioning elements define a main collecting chamber fed with the hot gases from the gas generator and open out directly firstly via first orifices into a annular chamber feeding a ring of injectors disposed facing the first turbine, and secondly via a variable orifice provided with section-adjusting means controlled by a regulation system into a second chamber feeding a ring of injectors facing the second turbine, a first manifold chamber collecting the outlet gases from the first turbine, and a second manifold chamber collecting the outlet gases from the second turbine, and in that orifices are provided through the main structure for exhausting the gases contained in the first and second manifold chambers with said annular space for recovering gases which opens out into said exhaust duct.

In another embodiment, the invention is applied to a structural assembly in which the turbines of the first and second turbopumps are fed in series from the gas generator, and the partitioning elements define a main manifold chamber fed with the hot gases from the gas generator and opening out via first orifices into a first annular chamber feeding a ring of injectors facing the first turbine, an intermediate manifold chamber for collecting the outlet gases from the first turbine and for feeding a ring of injectors disposed facing the second turbine, and a manifold chamber for collecting the outlet gases from the second turbine, and in that orifices are provided through the main structure for exhausting the gases contained in the manifold chamber for collecting the outlet gases from the second turbine into the said annular gas recovery space opening out into the said exhaust duct.

Advantageously, the intermediate chamber is outwardly delimited by a thin partition made of composite material and pierced by a plurality of small holes putting the intermediate chamber into communication with an annular cavity which is outwardly delimited by the main circularly symmetrical structure, and a tapping system is mounted on said main structure in order to cause said annular cavity to communicate selectively with said annular space for recovering gases, thereby selectively reducing the pressure in said intermediate chamber.

Advantageously, the circularly symmetrical main structure made of composite materials and interconnecting the first and second turbopumps comprises a first length of main structure connected to the pump body of the first turbopump and essentially circularly symmetrical about the axis of rotation of said first turbopump, and a second length of main structure connected to the pump body of the second turbopump and essentially circularly symmetrical about the axis of revolution of the second turbopump, the first and second lengths of the main structure being interconnected by radial pins which keep said lengths centered relative to each other while allowing for major changes in relative diameter between said lengths.

Preferably, the leakproof outer metal enclosure which surrounds said two-length main structure includes at least one expansion bellows assembled in dismountable manner to a thin metal wall of said leakproof outer enclosure such that each turbopump associated with a corresponding length of the main structure and with a portion of the leakproof outer enclosure is capable of being mounted and dismounted separately from the other turbopump.

It should be observed that it is not absolutely essential for the axes of the two turbopumps to be accurately aligned in a structure of the invention.

In a specific embodiment which facilitates the operations of assembly and disassembly, the stator of the second turbine is fixed to said second length of the main structure, and a split ring retains a transverse separating partition between the first and second turbines, which transverse partition is fixed to said first length of the main structure in such a manner that after the two lengths of the main structure have been separated and said split ring has been removed, the transverse partition and the other partitions defining the gas flow chambers can be dismounted merely by being extracted, said partitions being precompressed so as to be positioned relative to the main structure solely by elasticity.

BRIEF DESCRIPTION OF THE DRAWINGS

Embodiments of the invention are described by way of example with reference to the accompanying drawings, in which:

FIG. 3 is a longitudinal half-section and a partially cutaway elevation view of a structural asembly similar to that of FIG. 2, showing means for regulating the pressure in the chamber communicating between the first turbine and the second turbine of the two turbopumps;

FIG. 4 is a longitudinal half-section and elevation view of a structural assembly similar to that shown in FIGS. 2 and 3, but in which the axes of the shafts of the two turbopumps are not in alignment, but are at an angle; and FIG. 5 is a detail view showing an example of connection means for the main structure of the structural assembly of the invention.

DETAILED DESCRIPTION

Figure 1:
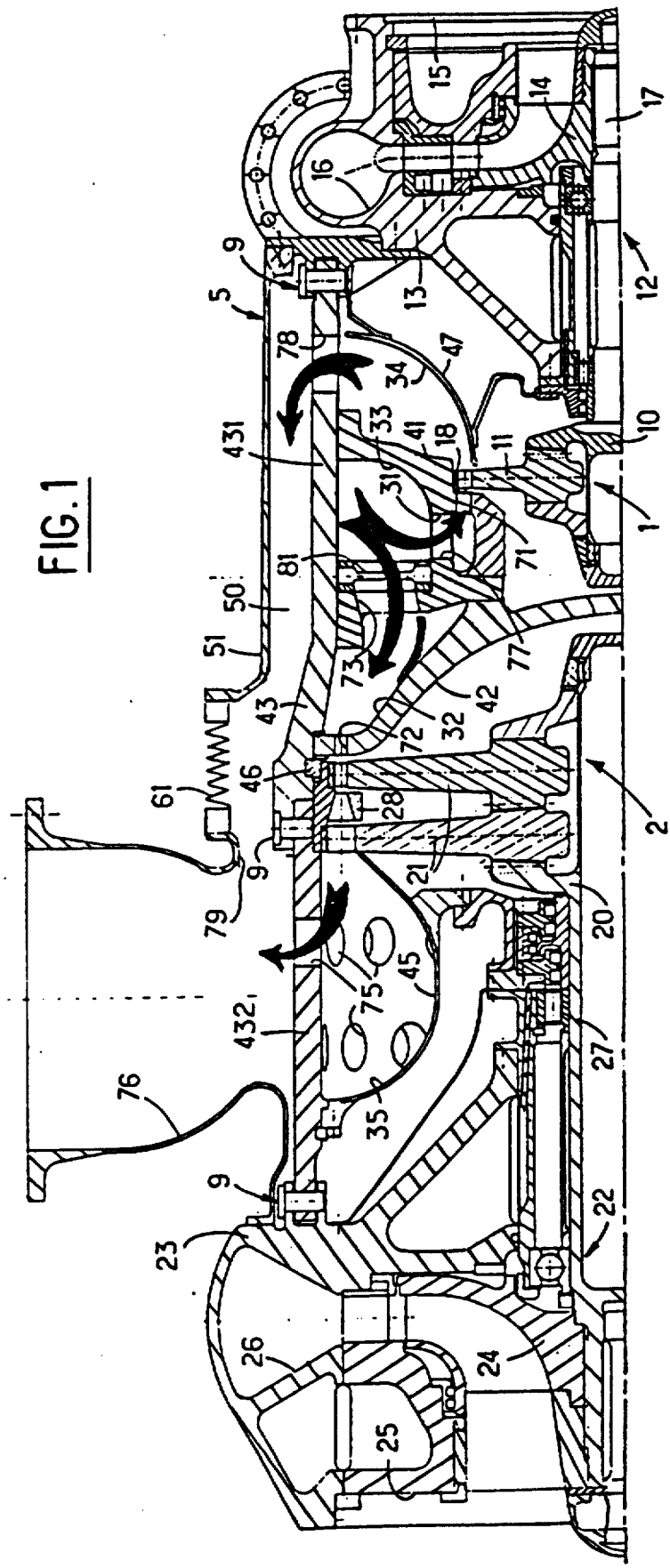
FIG. 1 is a longitudinal half-section view through a compact structural assembly in accordance with the invention for feeding a rocket engine with propellants under pressure, in which the turbines of the two turbopumps are fed with gas in parallel from the combustion gases produced by the gas generator.

FIG. 1 shows a first embodiment of the invention comprising a structural assembly having first and second turbopumps 1 and 2 for raising the pressure of first and second propellants that are to be fed to the combustion chamber of a rocket engine. The structural assembly of FIG. 1 is also designed to support the body of a gas generator (not shown in FIG. 1) which produces hot gases that are admitted to an annular manifold 33 from which the turbines 10 and 20 of the turbopumps 1 and 2 can be driven.

Figure 2:
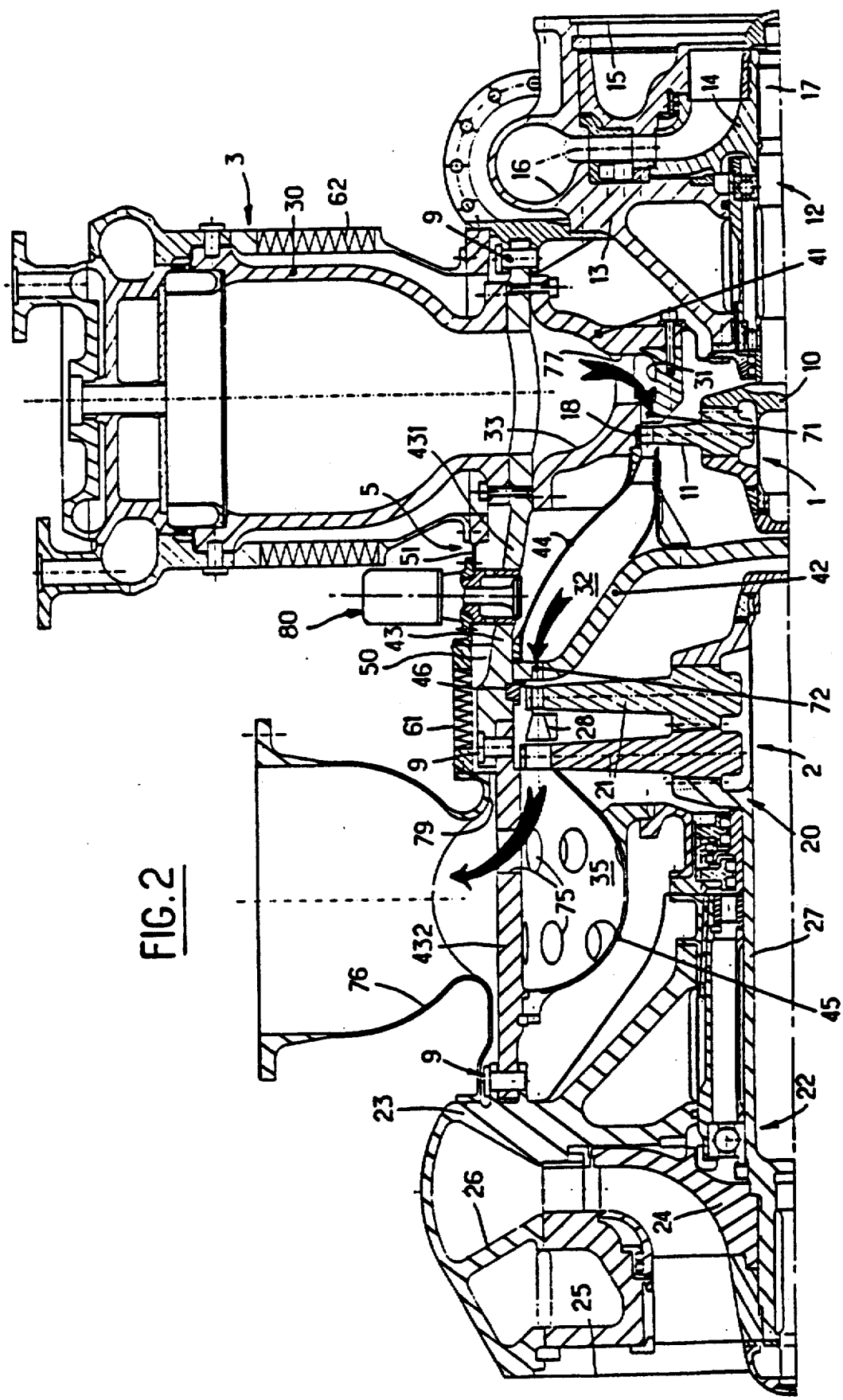
FIG. 2 is a longitudinal half-section veiw through a compact structural assembly in accordance with the invention for feeding a rocket engine with propellants under pressure, in which the turbines of the two turbopumps are fed with gas using a series circuit taking gas from the combustion gases produced by the gas generator.

In the embodiment shown in FIG. 1, as in the other embodiments shown in FIGS. 2 to 4, the high temperature outlet gases from the gas generator for driving the turbines 10 and 20 of the turbopumps 1 and 2 are caused to flow by means of a fixed structure 41 to 47 made of thermo-structural composite materials and defining a set of chambers with communicating cavities 31 to 35 for conveying and distributing the gases, and with separations between zones subjected to different pressures.

The fixed structure made of composite materials comprises firstly a main structure 43 which is essentially circularly symmetrical about the axes of the shafts 17 and 27 of the turbopumps 1 and 2 and surrounding the turbines 10 and 20 to serve as a connection between the metal pump bodies 13 and 23 of the turbopumps 1 and 2 and the support for the body 30 of the gas generator 3 (not shown in FIG. 1 but the same as shown in FIGS. 2 and 3).

The fixed structure made of composite materials further includes a set of internal partitioning elements 41, 42, 44, 45, and 47 applied to the main circularly symmetrical structure 43 in order to define a set of communicating cavities 31 to 35 for directing the flow of hot gases from the gas generator towards the turbines 10 and 20, and also for collecting the gases leaving the turbines 10 and 20 and exhausting these gases into a common exhaust duct 76.

The present invention relates essentially to the structural assembly for directing the flow of the turbine drive gases while enabling the pump bodies 13 and 23 of the turbopumps 1 and 2 to be fixed to the body of the gas generator in a manner which is both compact and capable of being disassembled. The gas generator itself may retain an entirely conventional structure while still having a combustion chamber 30 which is made of composite materials. The first turbopump 1 is conventional in structure with a pump 12 comprising a metal pump body 13, a liquid propellant inlet orifice 15, an annular delivery duct 16 for delivering propellant under pressure, and an impeller wheel 14 mounted at the end of the shaft 17 of the turbopump 1. The turbine 10 itself comprises a turbine wheel 11 which may be made of composite materials in conventional manner. The second turbopump 2 is similar in structure to the first turbopump 1, with a pump 22 comprising a metal pump body 23, a liquid propellant inlet orifice 25, an annular delivery duct 26 for delivering propellant under pressure, and an impeller wheel 24 mounted at the end of the shaft 27. Each turbo-pump 1 or 2 may naturally comprise a single-stage pump or a two-stage pump, and it may include a turbine having one or more wheels. Thus, in FIG. 1, the turbine 20 has two wheels 21.

In FIG. 1, it can be seen that the main structure 43 of composite material comprises a first length 431 which is connected to the pump body 13 and which is essentially circularly symmetrical about the axis of the shaft 17 of the turbopump 1, together with a second length 432 which is connected to the pump body 23 and which is essentially circularly symmetrical about the axis of the shaft 27 of the turbopump 2. These first and second lengths 431 and 432 are interconnected by connections 9 having radial pins made of composite material. Similarly, the connection between each of the lengths 431 and 432 of the main structure 43 of composite material and the corresponding pump body 13 or 23 is made by means of connections 9 extending radially and made of composite material. As shown in FIG. 5, a connection 9 comprises a radial pin 90 going through one end 91 of one of the two parts to be assembled together and through a forked end 92 of the other of the two parts to be assembled, the connection 9 having appropriate amounts of clearance and ensuring that the parts are properly centered while still allowing considerable relative changes in diameter between the parts. It is particularly advantageous to use appropriate connections such as the connections 9 between the main structure 43 and the pump bodies 13 and 23 since the pump bodies are cold parts in contact with the propellants, whereas the main structure 43 constitutes a set of hot parts in contact with the hot gases.

In FIG. 1, the partitioning elements 41 together with the lengths 431 of the main structure 43 on which they are fixed by means of screws made of composite materials serve to define a main manifold chamber 33 fed with hot gases from the gas generator. The main manifold chamber 33 opens out via orifices 77 into an annular chamber 31 feeding a ring of injectors 71 facing the turbine wheel 11 and co-operating with a stator 18. The manifold chamber 33 also communicates with a chamber 32 feeding a ring of injectors 72 facing the turbine wheels 21 and co-operating with a stator 28 fixed on the second length 432 of the circularly symmetrical structure 43. An orifice 73 provided with section-adjusting means 81, e.g. a butterfly valve, under the control of a regulation system serves to adjust the pressure of the gases in the chamber 32 to a value different from the pressure existing in the chamber 31. Thin walls 47 and 45 made of composite materials define, together with the main circularly symmetrical structure 43, respective outlet gas collecting manifolds 34 and 35 for the turbines 10 and 20. The annular outlet gas manifold chambers 34 and 35 of the turbines 10 and 20 open out via orifices 78 and 75 through the main housing 43 made of composite material into an annular space 50 for recovering exhaust gases and delimited by a leakproof outer metal enclosure 5 which surrounds the main structure 43 constituting the housing.

The leakproof outer metal enclosure 5 performs several important functions. Firstly, the enclosure 5 constitutes a protective screen relative to the surrounding environment, protecting it against thermal radiation from the main structure 43 made of composite materials.

Secondly, the leakproof outer enclosure 5 serves to recover gas leaks through the porous walls of the main structure 43.

Finally, the leakproof outer enclosure 5 facilitates recovering the exhaust gases from the turbines as collected by the chambers 34 and 35 and as exhausted via the orifices 78 and 75. All of the gases present in the annular space 50 are exhausted naturally, given the pressure therein, via an annular passage 79 leading to a single exhaust duct 76. It may be observed that in the embodiments shown in the drawings, the outlet gases from the turbine 20 may be exhausted directly into the single exhaust duct 76 via the orifices 75 whereas, in the embodiment shown in FIG. 1, the outlet gases from the turbine 10 are initially injected into the annular space 50. The duct 76 serves to convey the gases therein to a reinjection point in the engine, for example.

As can be seen in FIG. 1, the outer metal enclosure 5 which surrounds the main structure 43 made up from two lengths 431 and 432 itself includes an expansion bellows 61 which is dismountably assembled by screws to a thin metal wall 51 of the enclosure 5. This, together with making the main structure 43 from two lengths 431 and 432 makes it possible to separately mount or dismount each of the turbopumps 1 and 2 associated with a corresponding one of the lengths 431 and 432 of the main structure 43 and with a portion 51 of the enclosure 5.

A split ring 46 serves to retain a transverse separating partition 42 between the first and second turbines 10 and 20. The transverse partition 42 is fixed to the first length 431 of the main structure 43, e.g. by elasticity. In this case, the partition 42 is compressed and its elastic resilience provides the necessary contact force for holding it in position. With this type of mounting, after the two lengths 431 and 432 of the housing 43 have been separated and after the split ring 46 has been removed, the transverse partition 42 can be removed merely by being extracted. The other partitions such as the partition 41 of gas distribution manifold 43 and the partitions separating the chambers 31 and 32 are also easy to remove after the transverse partition 42 has been removed, without it even being necessary to remove the turbine 10.

The various internal partitions may naturally be fixed to the main structure 43 other than by elasticity, for example they may be fixed by means of screws or they may be built up from a plurality of composite segments which are held in place by a mechanical system.

FIGS. 2 and 3 show a second embodiment of the invention which makes use of turbopumps 1 and 2 and of a gas generator 3 which are identical to the corresponding elements already described with reference to FIG. 1. These various items are therefore shown in FIGS. 2 and 3 but they are not described again, and their component parts are given the same reference numerals as in FIG. 1.

The structural assembly made of composite materials, as shown in FIGS. 2 and 3 is very similar to the structural assembly shown in FIG. 1, and comprises a main circularly symmetrical structure 43 for connecting the bodies 13 and 23 of the turbopumps 1 and 2, together with the body 30 of the gas generator 3. It also includes a set of composite partitions bearing against the main structure 43 in order to delimit intercommunicating gas flow chambers. However in the embodiment shown in FIGS. 2 and 3, the turbines 10 and 20 are fed in series instead of being fed in parallel, with the gas being taken from the manifold chamber 33 which receives the gases produced in the combustion chamber of the gas generator 3.

Thus, the main manifold chamber 33 opens out via first orifices 77 solely into a first annular chamber 31 feeding a ring of injectors or diffusers 71 facing the wheel 11 of the turbine 10. The gas leaving the turbine 10 is collected in an intermediate chamber 32 which serves to feed a ring of injectors 72 facing the wheels 21 of the turbine 20. The chamber 35 for collecting the exhaust gas from the turbine 20 is completely identical to the chamber 35 shown in FIG. 1.

Compared with the embodiment shown in FIG. 1, the chamber 34 for collecting outlet gases from the turbine 10 has been omitted, and it is the intermediate chamber 32 as delimited by a thin outer wall 44 of composite material and the transverse wall 42 which takes over the function of the chamber 34.

As also shown in FIG. 3, when the turbines 10 and 20 are fed in series, a tapping system 80 can be used to reduce the pressure in the intermediate chamber 32 interconnecting the two turbines 10 and 20, should that be advantageous.

More particularly, the thin partition 44 of composite material is pierced by a set of small holes which put this cavity into communication with another annular cavity 36 which is delimited by the main circularly symmetrical structure 43. A valve 80 is fixed to said structure and serves to put the cavity 36 into communication with the leak-collecting annular space 50 defined by the outer metal enclosure 5 and the main structure 43. The tapping system including valve 80 thus replaces the butterfly valve system 81 for providing regulation by acting on the cross-section of the variable orifice 73.

In FIGS. 2 and 3, the gas-recovering outer envelope 5 surrounds the entire circularly symmetrical main structure 43 of composite material as in the case shown in FIG. 1. An expansion bellows 61 assembled by screws is likewise placed over the join between the two turbopump assemblies 1 and 2. It can be also be seen that a metal bellows 62 surrounds the composite material combustion chamber 30 of the gas generator 3, likewise for providing protection against thermal radiation and also for recovering any leaks that may occur at the gas generator 3.

It will be observed that in the embodiments of FIGS. 2 and 3, the outlet gases from the turbine 20 as collected in the chamber 35 are sent directly via the orifices 75 through the main structure 43 into the single gas exhaust duct 76. As a result, the annular space 50 per se serves only for recovering leaks and the regulating bleed from the tapping system 80, so it may be smaller in size than in the embodiment shown in FIG. 1 where said annular space 50 also serves to exhaust the outlet gases from the turbine 10.

In addition, in some cases, the gas-tightness of the circularly symmetrical main structure 43 may be improved by impregnation or by coating. It is then possible to provide a simplified metal outer enclosure 5, in particular by using a reduced thickness of metal and by using a relatively inexpensive substance. This serves both to reduce the mass of the outer enclosure and to reduce manufacturing costs.

In FIGS. 2 and 3, as in the embodiment shown in FIG. 1, the circularly symmetrical main structure 43 interconnecting the two turbopumps 1 and 2 comprises two circularly symmetrical elements 431 and 432 enabling each of the two turbopump assemblies to be mounted independently and to be interchanged, with each turbopump assembly comprising a turbopump 1 or 2 per se together with the corresponding circularly symmetrical element 431 or 432. As already mentioned, each of the circularly symmetrical elements 431 and 432 is fixed on the body of the corresponding pump 13 or 23 by means of radial pins 90 mounted through forks 92 fixed on the pump body 13 or 23, in such a manner as to allow for changes in diameter due to temperature differences between the components, while nevertheless maintaining centering. The connection between the two circularly symmetrical elements 431 and 432 is made in the same way using radial pins 90.

It may be observed that the structural assembly of the present invention is also applicable, as shown in FIG. 4, to an assembly of two turbopumps 1 and 2 in which the axes of their shafts are not in alignment but are at an angle relative to each other. The lengths 431 and 432 of the main structure 43 are then circularly symmetrical about the axis of the corresponding one of the turbopumps 1 and 2, while the outer enclosure 5 is somewhat in the form of a sector of a torus.

Since it is no longer absolutely essential to have the shafts of the two turbopumps 1 and 2 which are associated within the same structure strictly in alignment, it is possible to improve the positioning of the propellant inlets 15 and 25 to the pumps 12 and 22 relative to the feed lines, or else to satisfy other positioning requirements.

It may also be observed that the structural assembly of the invention can be used with turbines which are very different in diameter.

I claim:

1. A compact structural assembly for feeding propellants at high pressure to a rocket engine, the assembly comprising a gas generator, a first turbopump constituting a first turbine and a first pump for feeding the combustion chamber of the rocket engine with a first propellant component, a second turbopump constituted by a second turbine and a second pump for feeding the combustion chamber of the rocket engine with a second propellant component, means for delivering the hot gases from the gas generator to said first and second turbines, and means for collecting and exhausting the hot outlet gases from said turbines, wherein the assembly further comprises a main structure which is substantially circularly symmetrical about the axes of rotation of the first and second turbopumps, the main structure being made of thermo-structural composite materials, surrounding said first and second turbines, and interconnecting the body of the gas generator with the pump bodies of the first and second turbopumps; internal partition elements applied to said main structure and likewise made of thermo-structural composite materials, the partition elements dividing the space inside the said main structure into a plurality of intercommunicating cavities enabling the hot gases from the gas generator to flow to said first and second turbines, and also serving to collect the outlet gases from said turbines and to exhaust said gases towards a common exhaust duct; and a leakproof outer metal enclosure which surrounds said main structure, which constitutes a screen against thermal radiation from said main structure of composite materials, and which delimits an annular space opening out into said exhaust duct and serving to recover the outlet gases from the turbines and also the gases due to leaks through the porous composite walls.

2. A structural assembly according to claim 1, wherein the connections between the pump bodies constituting cold parts, and the said main structure constituted by hot parts, are provided by radial pins which keep said main structure centered while allowing for major relative changes in diameter between the main structure and the pump bodies.

3. A structural assembly according to claim 1, wherein the shafts of the first and second turbopumps are in axial alignment.

4. A structural assembly according to claim 1, wherein the shafts of the first and second turbopumps are at an angle.

5. A structural assembly according to claim 1, in which the turbines of the first and second turbopumps are fed in parallel from the gas generator, wherein the partitioning elements define a main collecting chamber fed with the hot gases from the gas generator and opening out directly firstly via first orifices into a annular chamber feeding a ring of injectors disposed facing the first turbine, and secondly via a variable orifice provided with section-adjusting means controlled by a regulation system into a second chamber feeding a ring of injectors facing the second turbine, a first manifold chamber collecting the outlet gases from the first turbine, and a second manifold chamber collecting the outlet gases from the second turbine, and wherein orifices are provided through the main structure for exhausting the gases contained in the first and second manifold chambers into said annular space for recovering gases which opens out into said exhaust duct.

6. A structural assembly according to claim 1, in which the turbines of the first and second turbopumps are fed in series from the gas generator, wherein the partitioning elements define a main manifold chamber fed with the hot gases from the gas generator and opening out via first orifices into a first annular chamber feeding a ring of injectors facing the first turbine, an intermediate manifold chamber for collecting the outlet gases from the first turbine and for feeding a ring of injectors disposed facing the second turbine, and a manifold chamber for collecting the outlet gases from the second turbine, and in that orifices are provided through the main structure for exhausting the gases contained in the manifold chamber for collecting the outlet gases from the second turbine into the said annular gas recovery space opening out into the said exhaust duct.

7. A structural assembly according to claim 6, wherein the intermediate chamber is outwardly delimited by a thin partition made of composite material and pierced by a plurality of small holes putting the intermediate chamber into communication with an annular cavity which is outwardly delimited by the main circularly symmetrical structure, and wherein a tapping system is mounted on said main structure in order to cause said annular cavity to communicate selectively with said annular space for recovering gases, thereby selectively reducing the pressure in said intermediate chamber.

8. A structural assembly according to claim 1, wherein the circularly symmetrical main structure made of composite materials and interconnecting the first and second turbopumps comprises a first length of main structure connected to the pump body of the first turbopump and essentially circularly symmetrical about the axis of rotation of said first turbopump, and a second length of main structure connected to the pump body of the second turbopump and essentially circularly symmetrical about the axis of revolution of the second turbopump, the first and second lengths of the main structure being interconnected by radial pins which keep said lengths centered relative to each other.

9. A structural assembly according to claim 8, wherein the leakproof outer metal enclosure which surrounds said two-length main structure includes at least one expansion bellows assembled in dismountable manner to a thin metal wall of said leakproof outer enclosure such that each turbopump associated with a corresponding length of the main structure and with a portion of the leakproof outer enclosure is capable of being mounted and dismounted separately from the other turbopump.

10. A structural assembly according to claim 9, wherein the stator of the second turbine is fixed to said second length of the main structure, and wherein a split ring retains a transverse separating partition between the first and second turbines, which transverse partition is fixed to said first length of the main structure in such a manner that after the two lengths of the main structure have been separated and said split ring has been removed, the transverse partition and the other partitions defining the gas flow chambers can be dismounted merely by being extracted, said partitions being precompressed so as to be positioned relative to the main structure solely by elasticity.

11. A structural assembly according to claim 1, wherein the partitioning elements defining the main annular collecting chamber are fixed by composite screws to the circularly symmetrical main structure.

12. A structural assembly according to claim 1, wherein the circularly symmetrical main structure made of composite materials is impregnated or coated, whereby the leakproof outer metal enclosure is made of a cheaper material having thinner wall thickness.

13. A structural assembly according to claim 2, wherein a forked connecting end is formed on at least one of the pump bodies and the main structure to be assembled together, and further wherein the radial pin is inserted through both tines of the forked connecting end.

* * * * *